Aug. 10, 1926.

J. B. DAVIS 1,595,228

LIQUID DISPENSING APPARATUS

Filed Sept. 15, 1924  2 Sheets-Sheet 1

INVENTOR
John B. Davis
BY Chapin & Neal
ATTORNEYS

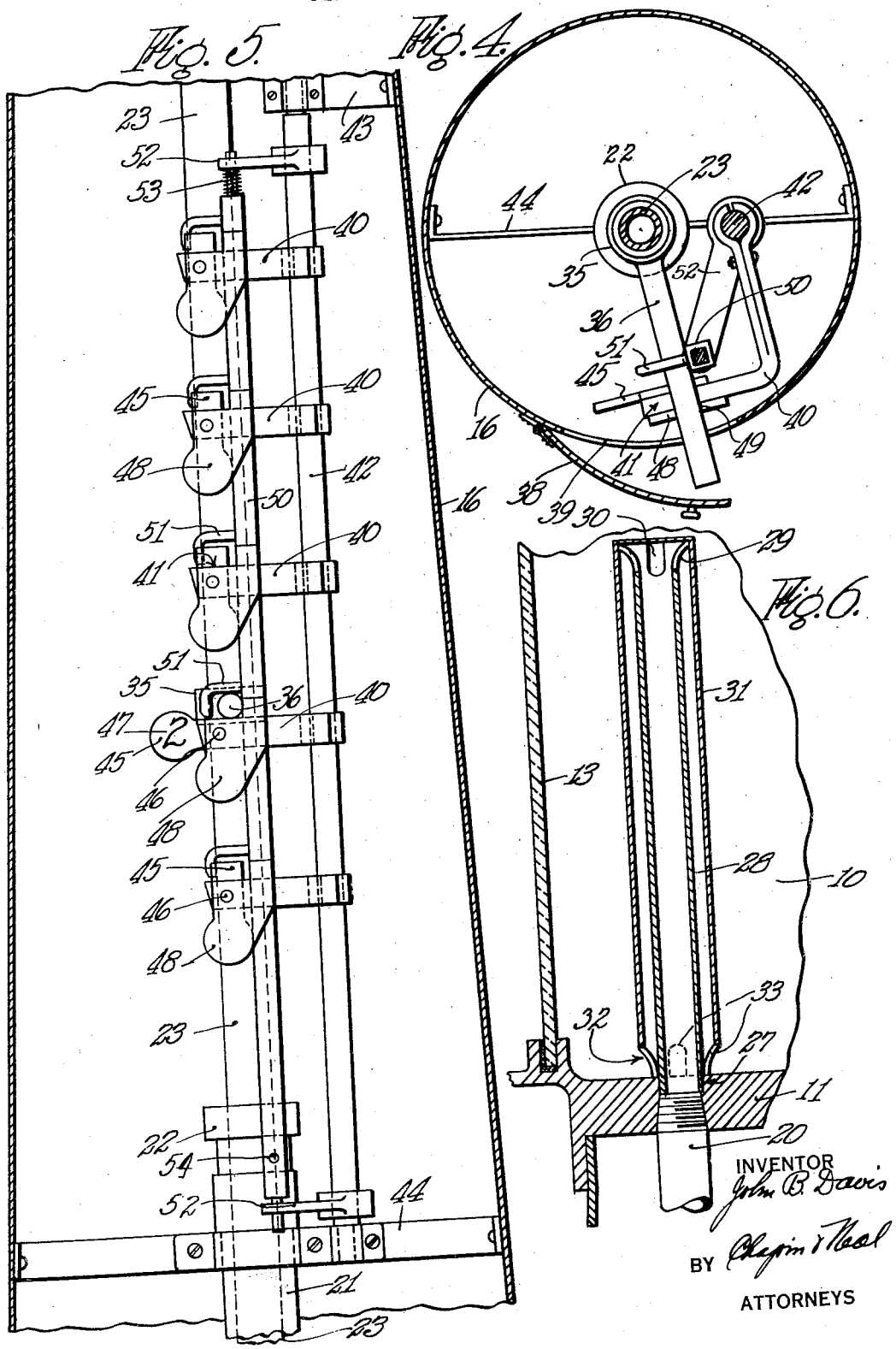

Patented Aug. 10, 1926.

1,595,228

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

LIQUID-DISPENSING APPARATUS.

Application filed September 15, 1924. Serial No. 737,801.

This invention relates to improvements in liquid dispensing apparatus, of the class adapted for use in dispensing gasoline, oils and the like.

One object of the invention is to provide a quantity indicator for each of the quantity stops of the apparatus, each of said indicators being normally concealed from the purchaser but movable into display position when the stop is engaged by its cooperating member, whereby the purchaser may readily determine the quantity which the apparatus is set to deliver.

Another object of the invention is to provide means for rendering difficult the fraudulent manipulation of the so called visible measuring apparatus of the type having a manually adjustable sliding gage tube and a manually operable delivery valve. According to present practice, the delivery valve has to be manually held open but the operator has one hand free and can change the adjustment of the gage tube, and, when this tube is used for overflow purposes, can cause part of the measured liquid in the receptacle to drain back to the supply tank, thereby defrauding the customer. According to this invention, manually releasable means are provided to hold the gage tube in the position to which it is set and two hands are necessary to change the adjustment of the gage tube, one to release it and another to move it, thereby discouraging the operator from improper manipulation of the gage tube.

Another object of the invention is to provide improved means for filling the measuring receptacle so as to avoid undue splashing and agitation of the liquid therein.

Other objects and advantages will appear in the following description and in the illustrative embodiment of the invention in the accompanying drawings in which:—

Figure 1:
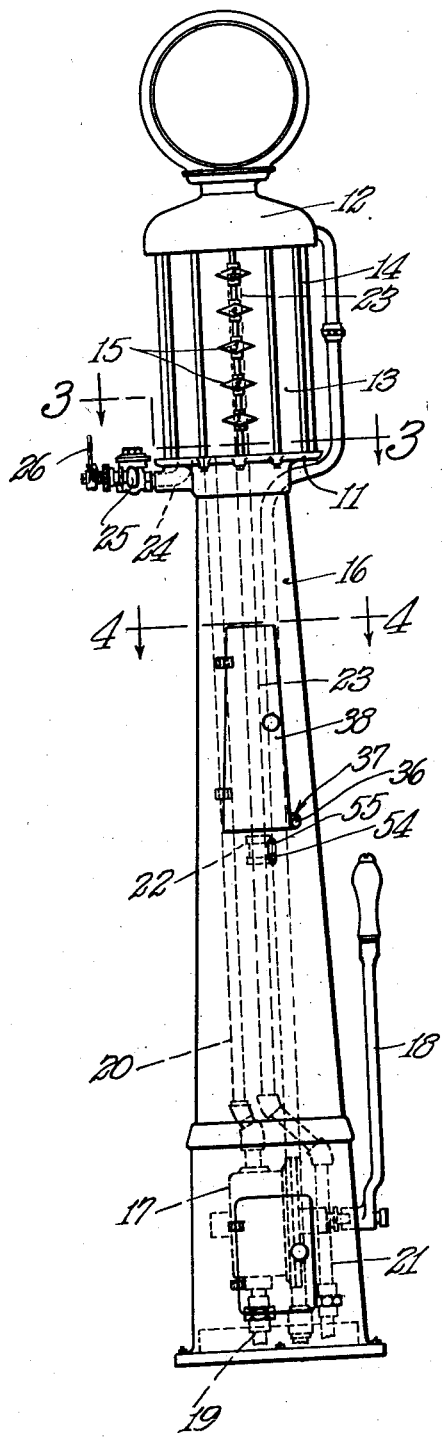
Fig. 1 is a small scale elevational view of a liquid dispensing apparatus embodying the invention.
Figure 3:
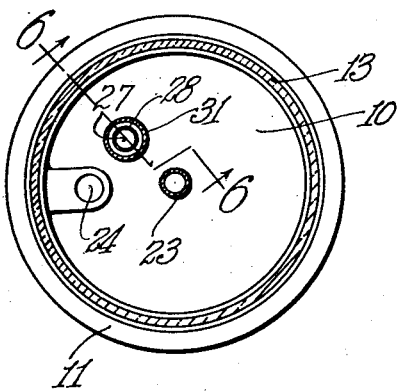

Figs. 3 and 4 are enlarged sectional plan views taken on the lines 3—3 and 4—4 respectively, of Fig. 1;

Fig. 5 is an enlarged fragmentary sectional elevational view of the apparatus, illustrative of the quantity stops, and of the quantity indicators and locking devices associated therewith; and Fig. 6 is a fragmentary sectional elevational view taken on the line 6—6 of Fig. 3.

The liquid dispensing apparatus, chosen by way of illustrative example as a background for this invention, is of the so called visible measuring type. It includes a measuring receptacle 10 having a base 11, a cap 12 and a transparent cylindrical wall 13 disposed therebetween and held in place by tie bolts 14. Suitable quantity indicators 15 are provided adjacent glass 13 to define the levels occupied by various measured unit quantities of liquid in the receptacle. The base 11 is supported on the upper end of a hollow pedestal 16. The lower part of this pedestal houses a suitable pump 17,—that illustrated being of the wing piston type oscillatable manually by a lever 18. A pipe 19 is adapted to connect the inlet of the pump 17 to the supply tank and a pipe 20 connects the outlet of the pump to the receptacle 10. A pipe 21 extends from the supply tank upwardly into the pedestal and terminates with a suitable stuffing box 22. An adjustable overflow pipe 23 in receptacle 10 extends downwardly into the pedestal and has its lower end telescoped into pipe 21 and slidably and rotatably engaged by the stuffing box 22. The receptacle 10 is provided with a delivery passage 24 controlled by a delivery valve 25, adapted to be manually opened by a lever 26. This valve is of the self closing type and therefore must be manually held open while liquid is being drawn from receptacle 10. The operator, by oscillating handle 18, operates the pump and forces liquid into receptacle 10. By vertical adjustment of the overflow pipe or gage tube 23, any excess over the quantity desired by the purchaser is drained back to the supply tank, after which valve 25 is opened to deliver the desired measured quantity, by gravity flow, from receptacle 10.

Referring to Fig. 6, the supply pipe 20 enters the base 11 of the measuring receptacle and opens into a relatively short supply passage 27. Seated at its lower end in this passage and communicating therewith is a tube 28 which extends upwardly into the receptacle forming a continuation of supply pipe 20. The upper end of tube 28 is open and outwardly flared, as at 29, the flaring portions being provided with notches 30 or other suitable openings. Telescoped over tube 28 is an outer tube 31, the upper end of which is closed and rests upon and closes the open end of the inner tube 28. The lower end of tube 31 is inwardly flared, as at 32, and provided with notches 33. The flaring portions of one tube frictionally engage the adjacent wall of the other tube and cause the outer tube to be held in proper spaced relation with the inner tube. Both tubes are readily removable when the cap 12 is removed. The liquid, pumped up through pipe 20, passes upwardly in tube 28 and thence through the openings 30 into the space between tubes 28 and 31, finally emerging through openings 33 into receptacle 10. By delivering the liquid in this manner, at or near the base of the receptacle, agitation of the surface of the liquid is avoided and one can always see the level of the liquid clearly defined on the glass 13.

Referring to Figs. 4 and 5, the slidable gage tube 23 has fixed thereto a collar 35, to which is attached handle 36, extending radially outward. Handle 36 normally extends out of the pedestal 16 through a recess 37 (Fig. 1) formed therein adjacent a door 38. When this door is opened, handle 36 may be swung out of recess 37 into the door opening 39 and lifted to set the gage tube at any of a number of predetermined levels. For the purpose of holding the tube at such levels, a plurality of stop fingers 40 are provided, each of which has an upper, horizontal, gaging surface 41 upon which handle 36 is adapted to rest. These fingers are secured, preferably in an adjustable manner, as indicated, to a vertical rod 42, which is fixed at its ends in suitable brackets 43 and 44 attached to pedestal 16. The bracket 44 serves also to hold the upper end of the overflow pipe 21.

Figure 2:
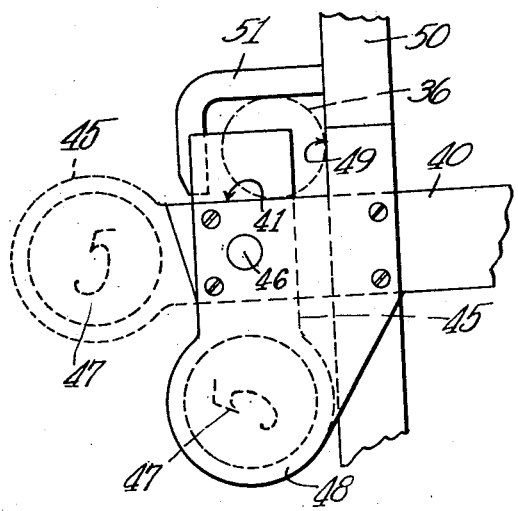
Fig. 2 is an enlarged elevational view of one of the quantity stops and the quantity indicator associated therewith.

One of the features of this invention is a quantity indicator associated with each stop and movable to display position by the act of engaging handle 36 with a quantity stop. One of these quantity indicators is clearly shown in Fig. 2. It consists of a thin metal piece 45, pivotally connected intermediate its ends at 46 to the stop 40 and normally hanging by gravity in the position shown by full lines in said figure. In this position, the upper portion of member 45 projects above the surface 41 of stop finger 40, whereby it is located in the path of handle 36 and will be engaged and moved thereby as the handle is moved over such surface. In this manner, the indicator is lifted from its depending position and swung through an angle of ninety degrees into the display position illustrated by dotted lines in Fig. 2.

The indicator may carry any appropriate marking, usually a numeral such as 47, indicating the number of gallons which will be discharged from the apparatus when handle is engaged with the stop. The indicator, 36 is engaged with the stop. The indicator, except for the portion projecting above surface 41, is concealed when in normal position by a thin plate 48 which is attached to the front face of finger 40. This plate 48 may be extended above surface 41, as shown, to provide a shoulder 49 to arrest the movement of handle 36 as it is moved over the surface 14. The contour of the side and lower edges of plate 48 are such as to prevent the handle 36 from being engaged with the stop finger 40 in any other manner than that intended, viz, with the surface 41.

In order to discourage the operator from improper operation of the apparatus, means have been provided whereby he is forced to use both hands in order to engage or disengage the handle 36 with a stop finger 40. This is intended to discourage the practice of changing the setting of the gage tube 23 with one hand while the delivery valve 25 is held open with the other hand. For this purpose a vertically disposed rod 50 is mounted for limited vertical sliding movement adjacent the stops and provided with a series of hooks 51, one for each stop finger. Rod 50 is slidably mounted at its ends in arms 52, secured to the described rod 42, and is urged downwardly by a spring 53. The ends of rod 50 are shouldered and the lower shouldered end, by abutting the upper face of the lower arm 52, limits the degree of downward movement. The extent of this movement is such that the outer downwardly turned parts of hooks 51 prevent the handle 36 from being moved off from that stop with which it may be engaged and from being moved onto any other stop without first lifting rod 50. The lifting is accomplished manually by means of a pin 54 which extends outwardly through a slot 55 in pedestal 16, as shown in Fig. 1. The handle 36, when engaged with any of the stop fingers is located in a substantially U-shaped recess bounded by the two arms of the hook 51 and one face of rod 50. The handle is thus held against sidewise displacement on the stop finger and held closely in the desired position near the shoulder 49. It is to be noted that one face of rod 50 also acts to limit the inward movement of handle 36 and thus performs an equivalent function to shoulder 49, which may be omitted, if desired, when rod 50 and hooks 51 are used. The handle 36 is yieldingly forced against and held in contact with the gaging surface 41 by the horizontal arm of one of the hooks 51 which arm is forced against the handle by spring 53.

In operation, the receptacle 10 is filled with liquid by operating the handle 18, the valve 25 being closed. The gage tube 23, unless previously set to the desired level, is so set, whereupon any excess liquid in the receptacle drains back to the supply tank, leaving the desired measured quantity in receptacle 10. This quantity is then delivered by opening valve 25, which must be manually held open and requires the use of one of the operator's hands. To change the setting of gage pipe 23 requires the use of two hands, one for handle 36 and one for pin 54. As a consequence, the adjustment of pipe 23 cannot readily be changed while the valve 25 is open to discharge the measured quantity. Consequently, the fraudulent practice of lowering pipe 23 while the delivery valve is open is discouraged.

To set the pipe 23, the operator with one hand lifts pin 54 and then with the other hand manipulates handle 36. The handle is first moved laterally to disengage it from a stop finger 40 and then lifted or lowered to carry it past the free end of the desired stop finger after which it is moved laterally over surface 41 of this stop finger until it brings up against shoulder 49 or rod 50, as the case may be. Pin 54 is then released and spring 53 forces rod 50 downwardly so cause the confinement of handle 36 to the selected stop finger.

The invention has been disclosed herein, in an embodiment at present preferred for illustrative purposes but the scope of the invention is defined by the appended claims rather than by the foregoing description.

What I claim is:

1. In combination, a quantity stop finger having a horizontal gaging surface and a shoulder, a member adapted to be moved over said surface and against said shoulder, releasable means for holding said member against said shoulder, comprising a vertically movable arm adapted to move downwardly and overlie said member when engaged with said surface and having a downwardly bent end to substantially prevent said member from being moved away from said shoulder.

2. In combination, a quantity stop finger having a horizontal gaging surface and a shoulder, a member adapted to be moved over said surface and against said shoulder, releasable means for holding said member against said shoulder, comprising an arm mounted for vertical sliding movement and adapted to overlie said member when engaged with said surface, and resilient means acting on said arm to yieldingly hold said member against said surface.

3. In a liquid dispensing apparatus, a measuring receptacle, a sliding gage tube for the receptacle, means for manually adjusting the gage tube to various positions including a plurality of stops and a member connected to the gage tube and engageable with any of said stops, a rod mounted adjacent said stops, a plurality of devices extending from said rod one adjacent each stop, each of said devices adapted to engage said member when the latter is engaged with the adjacent stop and hold the member against removal, and means for lifting said devices to release said member for disengagement from the stop.

4. In a liquid dispensing apparatus, a plurality of vertically spaced stop fingers, a member adapted to be moved vertically past the end of any of said stops and then laterally along the upper surface of the selected stop and supported thereby, and a vertically movable member provided with a plurality of inverted U-shaped recesses one for each stop, each of said recesses adapted to encompass the top and sides of said member when supported by a stop and confine it against disengagement therefrom.

In testimony whereof I have affixed my signature.

JOHN B. DAVIS.